Dec. 28, 1965 F. J. KLANCNIK 3,226,068

BRACKET SUPPORT FOR A UHF TELEVISION ANTENNA

Filed April 14, 1964

INVENTOR.
FRANK J. KLANCNIK
BY Norman Gerlach
ATTORNEY

United States Patent Office 3,226,068 Patented Dec. 28, 1965

3,226,068

BRACKET SUPPORT FOR A UHF TELEVISION ANTENNA

Frank J. Klancnik, Chicago, Ill., assignor to Hi-Lo Manufacturing Corp., Chicago, Ill., a corporation of Illinois Filed Apr. 14, 1964, Ser. No. 359,565
2 Claims. (Cl. 248—43)

The improved bracket support comprising the present invention is designed primarily for use in connection with an antenna conversion kit by means of which the owner of a television receiver whose antenna structure is designed for VHF reception and who has availed himself of facilities for receiving UHF signals may, conveniently and without requiring the services of a television serviceman, install a UHF antenna as an auxiliary adjunct to normal VHF reception.

In some parts of the United States, there are areas which previously had only TV signals from VHF stations but now are being served by one or more UHF stations (channels 14 through 83). For best results, UHF reception by a television receiver requires a different type of antenna structure from that which is required for VHF reception. Practically all present day television receivers are each factory equipped with two pairs of antenna lead-in terminals, one pair being for VHF reception and the other pair for UHF reception. Therefore, after a conversion of a television receiver has been made, usually by the installation of a UHF tuner, it is desirable that a UHF antenna structure be connected to the UHF terminals of the receiver. The present invention contemplates the provision of a novel and convenient bracket support for such an antenna structure, the support being easily applicable to the back or rear panel of the associated television receiver without any modification whatsoever of the rear panel or with a minimum of such modification, the operation being well within the skill of the average owner of a television set or receiver.

The provision of such a bracket support being the principal object of the invention, it is a further object to provide an antenna bracket support which, after installation on the rear panel of the associated television receiver, is capable of permitting the UHF antenna structure to be selectively adjusted both for height and direction.

Another object of the invention is to provide in an antenna bracket support of this character a package-type assembly of parts which includes both the UHF antenna structure and the bracket support and may be assembled at the factory and shipped to the field as a unit that is ready for installation in its entirety on a converted television receiver.

A further object of the invention is to provide an antenna bracket support which, together with its associated antenna structure, may be applied to an existing television receiver either without the aid of a tool other than a screwdriver or with a minimum of labor involving merely the drilling or punching of a single hole through the rear panel of the receiver.

A still further object of the invention is to provide an antenna bracket support which consists of only two short, suitably bent and welded together lengths of rod stock, a commercially available expansion bolt, and a pair of inexpensive friction rings, thus resulting in a bracket support which may be economically manufactured.

Another object of the invention is to provide an antenna bracket support which, although directly applicable to the rear panel of a television receiver and, although comprised in the main of metal parts, is so dimensioned that it offers practically no capacitance effect on the internal electronic circuits that are associated with the receiver to which the bracket support is applied.

With these and other objects in view, which will become more readily apparent as the following description ensues, the invention consists in the novel construction, combination and arrangement of parts shown in the accompanying single sheet of drawings forming a part of this specification.

Figures 1, 2, 3, 4:
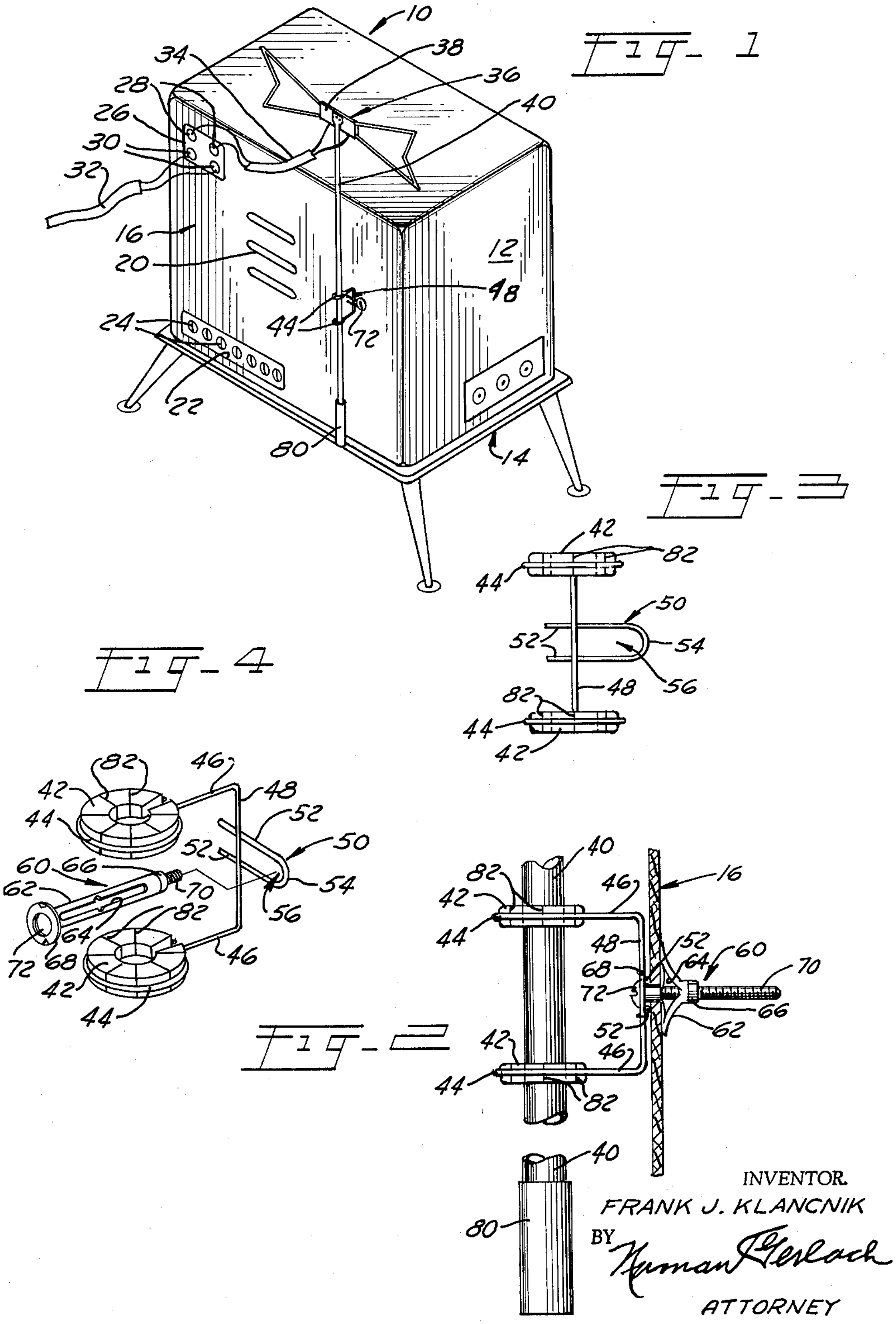
FIG. 1 is a rear perspective view of a television receiver, showing an antenna bracket support embodying the invention operatively applied thereto.
FIG. 2 is an enlarged sectional view.
FIG. 3 is a front elevational view showing the bracket support without the antenna mast.
FIG. 4 is an exploded perspective view of the improved bracket support.

Referring now to the drawings in detail and in particular to FIG. 1, a conventional television receiver is illustrated therein and it is designated in its entirety by the reference numeral 10. The receiver includes the usual box-like housing 12 which is shown as being supported upon a suitable stand 14. The housing 12 is provided with a removable rear panel 16 which is of the perforated hardboard type and has formed therein checkerboard series of holes 18. Air vent slots 20 and a relief slot 22 for exposure of certain controls 24 are also formed in the rear panel 16 of the television receiver 10. The latter constitutes a convenient mounting means for the antenna bracket support of the present invention and the particular panel that is illustrated in FIG. 1 is purely exemplary. The removable rear panel of television receivers vary widely in their details and, whether they be formed of perforated hardboard or otherwise, they usually are formed with various holes that are capable of being employed for anchoring purposes in the application of the present bracket support thereto as will be described in greater detail presently.

A small dielectric panel 26 is secured to the rear panel 16 and carries a pair of UHF binding posts 28 and a pair of VHF binding posts 30. The posts 30 are shown as having operatively applied thereto the terminal ends of a VHF transmission cable 32, while the binding posts 28 are shown as having operatively applied thereto the terminal ends of a UHF transmission cable 34, the opposite ends of such cable being operatively connected to a UHF bow-tie antenna unit 36. The transmission cable 34 and the UHF antenna unit 36 constitute elements of the package-type assembly with which the bracket support of the present invention is associated.

The bow-tie antenna unit 36 is conventional and constitues no part of the present invention except insofar as the manner in which it is operatively mounted on the rear panel 16 of the television receiver 10 is concerned. Bow-tie antenna units are well known and they are extremely effective for receiving UHF signals. The antenna unit 36 is essentially a miniature half-wave dipole which is carried on a Bakelite or other dielectric support, such as the support shown at 38, the latter being mounted on the upper end of an antenna mast or post 40. Bow-tie antennas possess poor antenna directivity as is the case with practically all horizontal dipole type antenna arrangements and, therefore, it is essential that means be provided for rotating the dipole arrangements to accommodate UHF signals coming from different directions. It is also desirable to be able to vary the elevation of a bow-tie antenna unit, especially an indoor antenna unit, in order to accommodate different positionings of the televison receiver and either to avoid or to make possible various reflection fields which may be present in the vicinity of any given installation. The maximum effective position of any given indoor bow-tie antenna unit is usually based upon empirical considerations where the best television picture results are obtained by a trial and error adjustment of the bow-tie antenna unit.

According to the present invention, the bow-tie unit 36 is supported upon a vertical antenna mast as previously indicated and this mast 40 is vertically slidable and rotatable in a pair of vertically spaced, axially aligned, friction rings 42. The latter are carried at the ends of a C-shaped length 43 of rod stock and are supported in respective circular loops 44. The loops are formed at the ends of the parallel horizontal arms 46 of the length of rod stock, while the vertical bight portion 48 of the C-shaped rod stock length has welded thereto a second C-shaped length 50 of rod stock. Such length 50 has parallel arms 52 and an arcuate connecting bight portion 54. The general planes of the two C-shaped lengths 43 and 50 extend at a right rangle to each other and both planes are vertical. As will be pointed out in greater detail presently, the C-shaped rod stock length 50 constitutes an attachment frame by means of which the bracket support as a whole may be supported from the rear panel 16, while the C-shaped rod stock length 43 constitutes a supporting frame for adjustably supporting the antenna mast 40.

The C-shaped length 50 of rod stock and the part of the bight portion 48 that is bridged thereby constitute a D-shaped void or opening 56 which is adapted to receive therethrough a conventional two-part expansion bolt assembly 60 (see particularly FIG. 4) by means of which the bracket support may be affixed to the rear panel 16 of the televison receiver 10.

The expansion bolt assembly 60 is a commercially available item of hardware and includes a flanged sleeve 62. The latter has slots 64 in the side wall thereof and carries at its distal end a fixed nut 66. A radial flange 68 of comparatively large diameter is provided at the front or proximate end of the sleeve. A draw-bolt 70 extends loosely through the flange 68 and the sleeve 62 and is threadedly received in the nut 66. The axial extent of the nut 70 is somewhat greater than the axial extent of the sleeve and the head 72 of the bolt bears against the flange 62 so that when the bolt is tightened in the sleeve, the side wall of the latter being weakened by the slots 64, will buckle radially outwardly as shown in FIG. 2, thus establishing a reaction surface behind any wall or other surface through which the expansion bolt assembly 60 is projected for anchoring purposes.

The expansion bolt assembly 60 is employed in the present instance to fasten the antenna bracket support of the present invention to the rear panel 16 of the television receiver 10 and, accordingly, the bolt assembly is passed forwardly through the D-shaped opening 56 and caused to enter one of the holes 18 in the perforated hardboard rear panel 16. If no hole is available, as would be the case in connection with a receiver whose rear panel is imperforate, a narrow access slot such as one of the slots 20 may be selected for attachment purposes. If no hole or slot is available for attachment purposes, a small hole may be drilled through the rear panel for attachment purposes.

The diameter of the radial flange 68 on the front end of the sleeve 62 is greater than the distance between the two parallel arms 52 of the C-shaped length 50 of rod stock so that the necessary clamping action by the expansion bolt assembly may be attained after the latter is passed through one of the holes 18 in the rear panel 16 of the television receiver 10. Upon tightening of the bolt 70 in the sleeve 62 in the usual manner of operation, the antenna bracket support will be securely fastened to the rear panel as shown in FIG. 1. The horizontal extent of the D-shaped void or opening 56 is such that wide lateral adjustment of the antenna bracket support to avoid contact with adjacent obstructions may be obtained.

The two vertically spaced friction rings 42 are preferably formed of a suitable elastomeric material or a plastic or other material which, although somewhat resilient, possesses an appreciable degree of resistance to compressional forces to the end that the rings are caused closely to hug the exterior cylindrical surface of the antenna mast 40 and support the mast in any selected position of elevation while at the same time allowing the mast to be rotated in such a manner as to give a desired directional characteristic to the bow-tie antenna unit 36. To facilitate both elevational and rotational adjustment of the antenna unit, a socketed sheath or handle 80 is telescopically received over the lower end of the mast 40. To lend centripetal gripping resilience to the rings 42, these rings may be radially grooved as indicated at 82. After a given installation has been effected in the manner indicated above, antenna adjustment for elevation and direction may be made by proper manipulation of the handle 80.

The invention is not to be limited to the exact arrangement of parts shown in the accompanying drawings or described in this specification as various changes in the details of construction may be resorted to without departing from the spirit or scope of the invention. Therefore, only insofar as the invention has particularly been pointed out in the accompanying claims is the same to be limited.

Having thus described the invention what I claim as new and desire to secure by Letters Patent is:

1. A bracket support by means of which a television antenna mast may be supported in a vertical position from the rear panel of a television receiver, said bracket support comprising two generally C-shaped lengths of rod stock, one of which constitutes an attachment frame and the other of which constitutes a mast-supporting frame, each frame including horizontally disposed parallel arms and a connecting bight portion, the outer ends of the attachment frame being welded to the bight portion of the mast-supporting frame with the general planes of the two frames extending vertically and at a right angle to each other, the attachment frame and the limited extent of the bight portion of the mast-supporting frame which it subtends constituting an attachment opening designed for reception therethrough of a headed fastening device by means of which the attachment frame may be secured to said rear panel, a friction ring mounted on the distal end of each parallel arm of said mast-supporting frame, the two friction rings being coaxial for projection of the mast therethrough with a sliding fit, said friction rings being adapted to exert a centripetal gripping force on said mast of sufficient magnitude that the mast is self-supporting in any position of elevation thereof but of insufficient magnitude to prevent manipulation of the mast.

2. A bracket support by means of which a television antenna mast may be suported in a vertical position from the rear panel of a television receiver, said bracket support comprising two generally C-shaped lengths of rod stock, one of which constitutes an attachment frame and the other of which constitutes a mast-supporting frame, each frame including horizontally disposed parallel arms and a connecting bight portion, the outer ends of the attachment frame being welded to the bight portion of the mast-supporting frame with the general planes of the two frames extending vertically and at a right angle to each other, the attachment frame and the limited extent of the bight portion of the mast-supporting frame which it subtends constituting an attachment opening designed for reception therethrough of a headed fastening device by means of which the attachment frame may be secured to said rear panel, the distal ends of the parallel arms of said mast-supporting frame being formed with circular loops, a friction ring secured within each circular loop, the two friction rings being coaxial for projection of the mast therethrough with a sliding fit, said friction rings being adapted to exert a centripetal gripping force on said mast of sufficient magnitude that the mast is self-supporting in any position of elevation thereof but of insufficient magnitude to prevent manipulation of the mast.

References Cited by the Examiner

UNITED STATES PATENTS

| | | | |
|---|---|---|---|
| 2,681,195 | 6/1954 | Bradt et al. | 248—43 |
| 2,846,174 | 8/1958 | Sewell | 248—223 |
| 3,071,338 | 1/1963 | Kaufman et al. | 248—43 |

FOREIGN PATENTS

| | | |
|---|---|---|
| 73,841 | 8/1948 | Norway. |

CLAUDE A. LE ROY, *Primary Examiner.*